(12) United States Patent
Uray et al.

(10) Patent No.: US 6,635,759 B2
(45) Date of Patent: Oct. 21, 2003

(54) LUMINESCENT 4-TRIFLUOROMETHYL 1-2-QUINOLONES WITH LONG WAVE UV ABSORPTION AND THE USE THEREOF

(75) Inventors: Georg Uray, Vogelweiderstrasse 15, Graz (AT), 8010; Karlheinz Niederreiter, Graz (AT)

(73) Assignee: Georg Uray, Graz (AT)

( * ) Notice: Subject to any disclaimer, the term of this patent is extended or adjusted under 35 U.S.C. 154(b) by 0 days.

(21) Appl. No.: 10/034,923

(22) Filed: Dec. 31, 2001

(65) Prior Publication Data

US 2002/0058793 A1 May 16, 2002

Related U.S. Application Data

(63) Continuation of application No. PCT/AT00/00105, filed on Apr. 28, 2000.

(30) Foreign Application Priority Data

Apr. 30, 1999 (AT) ................................................ 775/99

(51) Int. Cl.$^7$ .......................................... C07D 215/227
(52) U.S. Cl. ........................ 544/128; 435/6; 436/172; 436/800; 530/409; 544/128; 544/345; 540/488; 540/495; 546/5; 546/82; 546/83; 546/90; 546/101; 546/157
(58) Field of Search ...................... 546/157, 5; 544/128

(56) References Cited

U.S. PATENT DOCUMENTS

| 5,389,600 A | 2/1995 | Selby | 504/240 |
| 5,622,821 A | 4/1997 | Selvin et al. | 435/6 |

FOREIGN PATENT DOCUMENTS

WO   WO2001016108   *  3/2001

OTHER PUBLICATIONS

Walter Fabian et al, J. Mol. Struct., vol. 477, 1999, "Substituent effects on absorption and . . . ", pp. 209–220.

Georg Uray et al, Helv. Chim. Acta, vol. 82(9), 1999, "Long–wavelength–absorbing and . . . ", pp. 1408–1417.

* cited by examiner

Primary Examiner—Bernard Dentz
(74) Attorney, Agent, or Firm—Jacobson Holman PLLC

(57) ABSTRACT

The invention relates to a substituted 4-trifluoromethyl carbostyril according to formula (I) and is characterised in that the 4-trifluoromethyl carbostyril is provided with an absorption maximum between 350 and 420 nm and a luminescence maximum between 430 and 900 nm. The molecule can be substituted with groups that are useful for complexing metal ions and/or for binding the molecule to relevant groups of a target molecule or a solid supporting material. The carbostyril as described above can inter alia serve as an antenna molecule of a lanthanide complex. Said complexes can be templates and can be brought into contact with a directly bound or free colour molecule which absorbs in the rant of 580–710 nm. Luminescence effects and decay periods can be measured after the contact with a relevant analyte.

24 Claims, 1 Drawing Sheet

Figure 1:
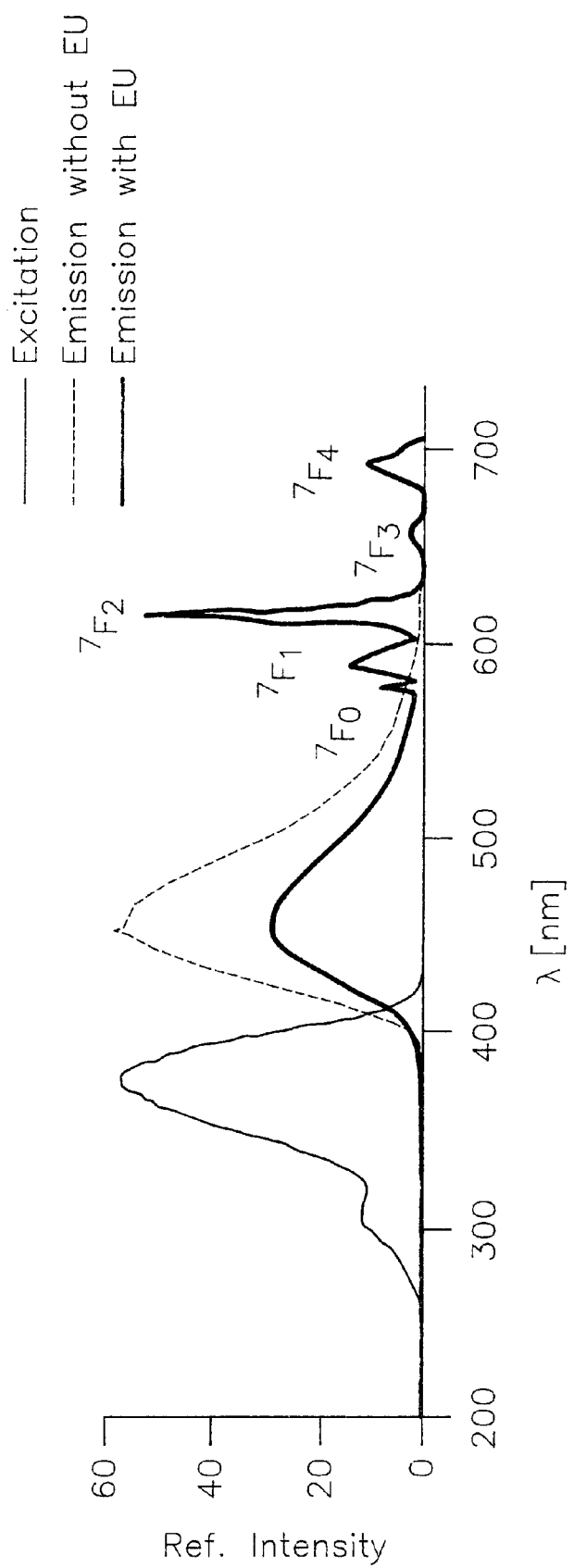

LUMINESCENT 4-TRIFLUOROMETHYL 1-2-QUINOLONES WITH LONG WAVE UV ABSORPTION AND THE USE THEREOF

This is a continuation of PCT/AT00/00105 filed Apr. 28, 2000 and published in German.

DESCRIPTION

Luminescent coumarins have found widespread use as photosensitizers, laser dyes or pH indicators in biochemistry and medicine. There is therefore a huge amount of experimental and theoretic data about the luminescence characteristics, photophysics and photochemistry of coumarin derivatives. As for the similar application of the chemically strongly related 2-quinolones (carbostyrils), which can be considered as aza analogues of the coumarins and also luminescent, there is comparatively much less application data in literature. Though it is just the carbostyrils who should be more photo-stable and chemically more inert than the coumarin derivatives.

This relative lack of applications as luminescence markers is partly to be attributed to the fact that, much unlike the coumarins, despite hundreds of well-known carbostyril derivatives, hitherto obviously nobody has succeeded in shifting the absorption wavelength, compared to the unsubstituted form (330 nm), much beyond the value of 350 nm in the longer wave area and at the same time in obtaining a strong increase of the luminescence quantum yield. In case of coumarin, which in the unsubstituted state absorbs at shorter wavelengths than carbostyril, this succeeds easily by introducing electron delivering amino or ether substituents, mainly in position 7.

In contrast to this, for example, in the series of the 4-methylcarbostyrils the long wave UV absorption maximum of 331 nm measured in dimethylsulfoxide is shifted by an additional methoxy function in position 7 even to a slightly shorter wavelength (328 nm).

The production of photo-stable and strongly luminescent carbostyrils with absorption maxima over 350 nm would be of essential interest because of the more efficient elimination of disturbing, short-wave-absorbing foreign fluorophores in a complex matrix. Important applications in measuring technology will result for long wave absorbing carbostyrils thanks to extremely inexpensive LEDs, which have been recently available commercially, and which in the near UV area emit at around 370 nm and therefore in the near future will be important especially in the sensor development.

The interest in luminescent dyes has recently concentrated on analytic applications in biochemistry. Among the most promising applications there is the use of such chromophores for the production of lanthanide chelates, above all such with europium and terbium ions. To the chromophores used belong among others already determined carbostyrils, especially N-acyl derivatives of the 7-amino-4-methyl-2(1H)-quinolone (carbostyril 124). This has been described by M. Li and P. R. Selvin for example in J. Am. Chem. Soc., 117 (1995) 8132 and Bioconjugate Chem., 8 (1997) 127. The excitation in this case happens at 337 nm. The possibility of time-resolved measurements of the long-wave lanthanide emission makes such complexes attractive, particularly in biologic systems. They can for example be applied as favourable alternatives to the radioactive markings (radioimmunoassays, RIA) and simple fluoroimmunoassays (FIA). The so-called DELFIA® test (dissociation enhanced lanthanide fluorescence immunoassay) already represents a routine method. A further application of the time-resolved measurement of lanthanide complexes is the use of these chelates as luminescence markers by covalent binding with analytes in biological matrix.

DISCLOSURE OF INVENTION

The present invention resolves the problem of providing longer wave absorbing and strongly luminescent carbostyrils with UV maxima above 350 nm by the introduction of a very specific specimen of substituents with the general formula I. They are 4-trifluoromethyl substituted quinoline-2-ones with essentially two substituents or functionalities in position 6 and 7 bound via oxygen or nitrogen, which together cause long-wave absorption maxima above 350 nm and high emission quantum yields in combination with sufficient Stokes shifts. This could not be foreseen for the long-wave maximum because of the in itself rather disadvantageous effect of a methoxy group alone in position 7 (as described above).

In such a structure 1, without significant change of the luminescence properties, for example in position 1 and 3 additional substituents may be present that are suitable for the introduction of various other functionalities. Equally, in position 6 and 7 the residues R1 and R2 may have useful functions, suitable for complexing a metal ion or for the binding with reaction-capable analytes or for the immobilization on solid materials.

The potential of compounds of formula I is explained according to the invention by the bond of various side chains and functionalities and the measurement of the absorption properties as well as of the luminescence characteristic. The side chains for example allow the complex-like binding of europium (III) ions as well as the immobilization of these complexes on an analyte or at a solid matrix. For example, the nitration of the 4-trifluoro-methyl-6,7-dimethoxycarbostyril leads to the 3-nitro derivative that after reduction gives the corresponding 3-amino derivate. An N(1)-methylation of the nitro compound and following reduction to the analogous N(1)-methyl-3-amino compound or N(1)-benzyl-3-amino compound or the N(1)-phthalimidomethyl compound hardly changes the spectral properties. Therefore, also position 1 is suitable for bonding further functions, which for example can lead to immobilization later. For example already the 3-amino-4-trifluoromethyl-6,7-dimethoxycarbostyril can be acylated with a suitable anhydride (e.g. diethylenetriaminepentaacetate dianhydride "DTPA") in position 3 on nitrogen. After hydrolysis a tetracarboxylic acid arises, which can be easily complexed with europium ions. Alternatively, before the hydrolysis of the anhydride, one can apply a linker either directly with a suitable nucleophile or via a second intermediate, that for its part can bind the finished complex to an analyte or to a further chromophore or to a fixed matrix.

For example, the mono anhydride formed with DTPA and carbostyril can be further activated by prolonged heating and hence additional formation of a 6-membered cyclic imide with the former 3-amino nitrogen of the trifluoromethyl-carbostyril (formula IIb in example 6). Easy selective hydrolysis of the anhydride function in IIb yields quantitatively an imine IId, which is capable to react with nucleophiles such as amines and hydrazines to form compounds of type IIIa. Hence selective activation and subsequent reaction of different carboxylic acid functions via the key DTPA intermediate IIa is possible.

The complexing with lanthanide ions can take place according to the demand before or after the completion of the total molecule. According to structure 1, the explanations above as well as the examples quoted later, it is obvious that complex-forming side chains at one of the points of the molecule indicated by R lead to compounds that still show the characteristic according to the invention of a desired UV absorption beyond 350 nm.

The substantial photo-physical properties of the example compound (III) complexed with $Eu^{3+}$ and of the underlying chromophore (1) are reproduced in FIG. 1 and in the experimental part of the examples. From this it is clearly visible that after excitation at 370 nm of the europium complexes, besides the strong inherent fluorescence of the carbostyril, a marked transfer of the excitation to the complexed europium ion takes place (so-called antenna effect). Such a transfer of the excitation energy to europium has hardly been observed so far in this high absorption wavelength range, that is, after irradiation with light with wavelengths above 370 nm. The range considered efficient so far was between around 300 and 350 nm. Europium ions themselves are luminescent alone, that is, without transferring chromophore, only extremely weakly.

From the examples it is also clear, that an additional covalently bound or only added dye with a different absorption wavelength(e. g. 550 nm) does not disturb this process. In contrast to this, a dye, which absorbs in the range of the europium emission (570–710 nm), acts in a dynamic quenching way (luminescence intensity and decay time diminish) and therefore makes possible the construction of almost any sensor. The only condition that has to be fulfilled is that such an additional dye acts as an indicator for the analyte or parameter to be measured, such as the hydrogen ion concentration. Similar effects result naturally also from the protonation/deprotonation of the carbostyril chromophore on the carbonyl function or on a nitrogen atom bound directly to the carbostyril, because with this its spectral properties and consequently its antenna effect are changed. Time-resolved measurement of the emission spectrum after around a microsecond exclusively shows europium bands (without short-lived basic fluorescence), whose drop in a time lapse of around 2 milliseconds can also become the measuring principle. This proves the applicability of this complex type for time-resolved luminescence measurements also on a strongly fluorescence background.

Some of the new europium(III) complexes of 4-trifluoromethylcarbostyril derivatives are pH-sensitive. For example the complex of IIIb is an indicator in the range between pH 7 and 9 with a $pK_a$ of approximately 8.2. In the range between pH 7 and pH 4 there is a flat maximum, luminescence again decreasing between pH 4 and 2. Most interestingly, luminescence intensity and decay time simultaneously change with pH. Thus the design of luminescence decay time-based optical sensors for pH and gases such as carbon dioxide, which changes the pH of suitable buffer solutions, becomes possible. This is of special interest, since the europium complexes do not show a sensitivity of their luminescence to oxygen, which is in contrast to ruthenium dyes commonly used in luminescence decay time-based optical pH or $CO_2$ sensors.

EXAMPLE 1
6,7-dimethoxy-4-trifluoromethyl-2-(1H)-quinolone and the analogue ring-closed 6,7-methylenedioxy-4-trifluoromethyl-2-(1H)-quinolone:

8.5 g of ethyl trifluoromethylacetoacetate are mixed with 1.77 g 3,4-di-methoxyanilin and heated for 30 min until boiling. The alcohol formed and surplus reagent are distilled off, 5 ml of semi-concentrated sulphuric acid are added and heated for 10 min up to 100° C. The mixture is poured on water and the precipitation formed is recrystallised from ethanol. Yield 80%, melting point 272 degrees C., UV λ max 367 nm, emission maximum 440 nm (DMSO), IR, (KBR) CO: 1675 cm-1. Analogously from 3,4-methylenedioxyaniline the compound 6,7-methylendioxy-4-trifluoromethyl-2-(1H)-quinolone can be produced. Melting point 288–290° C., UV λ max 367 nm (DMSO), emission max 438 nm (DMSO), IR (KBR) CO: 1675 cm-1.

EXAMPLE 2
6,7-Dimethoxy-3-nitro-4-trifluoromethyl-2-(1H)-quinolone:

3.5 g of 6,7-dimethoxy-4-trifluoromethyl-2-(1H)-quinolone are nitrated with 50 ml of a semi-concentrated mixture of nitric acid and sulphuric acid under ice cooling. The mixture is heated to room temperature and poured on water. The precipitation formed is cleaned with Flash Chromatography (silica gel, dichloromethane:acetone 9:1). Yield 70%, melting point 270° C., UV λ max 391 nm (DMSO), IR (KBR) CO: 1670cm-1.

EXAMPLE 3
3-Amino-6,7-dimethoxy-4-trifluoromethyl-2-(1H)-quinolone:

1.1 g of 6,7-Dimethoxy-3-nitro-4-trifluoromethyl-2-(1H)-quinolone in 200 ml of ethanol are reduced for 24 hours at 50° C. and 3 bar hydrogen pressure with platinum (IV) oxide. From toluene result 0.83 g (85%) of amino compound. Melting point 221° C., UV λ max 350 nm (DMSO), emission max 431 nm (DMSO), IR (KBr) 3520, 3405 (NH2); 1620 (CO).

EXAMPLE 4
6-Amino-7-methoxy-4-trifluoromethyl-2-(1H)-quinolone and the 6-amino-7-hydroxy-4-trifluoromethyl-2-(1H)-quinolone:

3 g of ethyl trifluoromethylacetoacetate are mixed with 0.60 g of 3-methoxy-4-nitroanilin and heated for 30 min until boiling. The alcohol formed is distilled off and the precipitation formed at room temperature is sucked off. Yield: 0.83 g (76%) 4,4,4-trifluoracetoacetyl-3-methoxy-4-nitroanilide. 0.83 g 4,4,4-trifluoracetoacetyl-3-methoxy-4-nitroanilide are stirred portion-wise into 11.5 g 110° C. hot polyphosphoric acid and nourished for 30 min at 115° C. After that it is poured on water and the precipitation formed is recrystallized from ethanol. Yield: 0.26 g (33%), melting point 273–275° C. (dec). 7-methoxy-6-nitro-4-trifluoromethyl-2-(1H)-quinolone. 0.26 g of this compound are suspended in 30 ml of ethanol and reduced for 20 hours at 40° C. with $H_2/PtO_2$ (3 bar hydrogen pressure). The isolated raw product is cleaned with Flash chromatography (silica gel, toluene acetone 1:1) Yield: 0.183 g (82%). Melting point 238° C. (toluene, dec), UV λ max 400 nm (DMSO), emission max 517 nm (DMSO), IR (KBr) 3410, 3320 (NH2); 1670 (CO).

Ether cleavage with concentrated HBr leads to the hydroxy compound 6-amino-7-hydroxy-4-trifluoromethyl-2-(1H)-quinolone, UV λ max 396 nm (ethanol)

EXAMPLE 5
7-Methoxy-6-acetylamino-4-trifluoromethyl-2-(1H)-quinolone:

27,85 mg of 7-methoxy-6-amino-4-trifluoromethyl-2-(1H)-quinolone are dissolved in 0,5 ml of glacial acetic acid, mixed with 0.15 ml acetic acid anhydride and made to react for 2 hours at 20° C. After subtracting the solvent, the remainder is cleaned with Flash chromatography (silica gel,

EXAMPLE 6

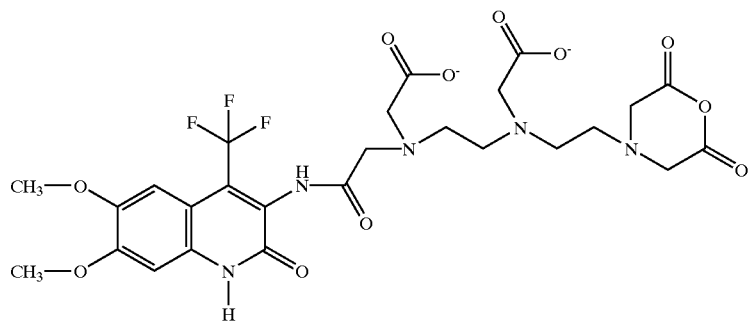

IIa

Transformation of 3-amino-6,7-dimethoxy-4-trifluoromethyl-2-(1H)-quinolone with diethylenetriaminepentaacetic acid dianhydride (DTPA-dianhydride) into anhydride IIa according to general formula II claim 3, X=NH—CO—CH2:

3.6 g of DTPA-dianhydride and 0.6 g of the amino compound are heated in 40 ml of abs. pyridine with 50 mg of 4-pyrrolidinopyridine. After the cooling, the whole is diluted with ether, the precipitation formed contains the described mono anhydride (IIa) as raw product or if heated for a prolonged time, the imide-anhydride IIb.

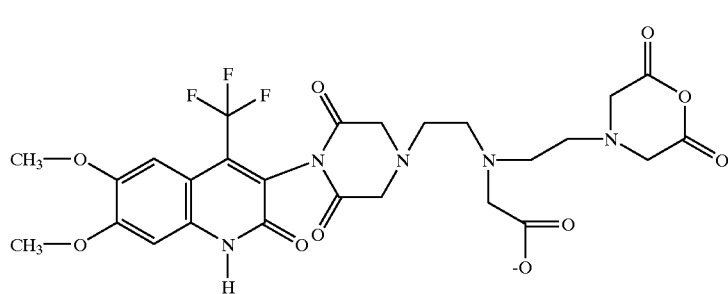

IIb

EXAMPLE 7

Hydrolysis of the anhydride IIa or anhydride-imide IIb of example 6 into tetraacetic acid (IIIb, claim 20 Y=OH) and measurement of the luminescence decay time after complexing with Europium3+:

IIa or IIb are incorporated in 5 ml water, hydrolysed and acidified. The formed acid IIIb is purified by means of preparative HPLC. (Gradient: water/acetonitril, Lichrospher 100-RP18, Merck). Yield of both steps 50%.

Melting point: Decomposition >180° C., UV λ max 368 nm, emission max 459 nm (water). Mass spectrum MALDI m/z 663.9, sinapinic acid. Complexing of the acid (IIIb) with an equivalent Eu(III)chloride at pH 3–7 leads to a product, which after excitation at 370 nm shows the characteristic europium luminescence with sharp bands at 578, 594, 615, 653 and 693 nm. The measurement of the emission spectrum after one microsecond yields a practically identical europium spectrum without any inherent fluorescence of the carbostyril-chromophore. The measurement of the luminescence decay time gives a decay time of 600 microseconds in water (pH 7) and 990 microseconds in dimethylsulfoxide.

EXAMPLE 8

Transformation of the anhydride (IIa) with 4-nitro-L-phenylalanin and reduction into amino compound IVa: General formula IV in claim 4, carbostyril as in formula IIa:

The anhydride above described (IIa), formed from 100 mg 3-Amino-6,7-dimethoxy-4-trifluoromethyl-2-(1H)-quinolone is mixed with 4 ml of pyridine, 250 mg of 4-nitro-L-phenylalanine and 3 ml of DMSO. After 4 hours of heating up to 120° C. the mixture is cooled, mixed with ether and the precipitation formed is incorporated in 15 ml water and reduced at 3–4 bar hydrogen pressure at room temperature (catalyst Pd/C).

The amino compound (IVa) is isolated from the filtrate by means of preparative HPLC. Total yield starting from 3-amino-6,7-dimethoxy-4-trifluoromethyl-2-(1H)-quinolone 20% (gradient water/acetonitril; Lichrospher 100-RP18, Merck). Melting point: decomposition >175°, UV λ max 369 nm, emission max 454 nm (DMSO). Mass spectrum MALDI m/z 826.7, sinapinic acid. Complexing of the amino compound with an equivalent Eu(III)chloride at pH 5.7 leads to a product, that after excitation at 370 nm shows the characteristic europium luminescence with sharp bands at 578, 594, 615, 653 and 693 nm.

EXAMPLE 9

Transformation of the amino compound (IVa) into isothiocyanate (Va), general formula V in claim 4, carbostyril as in formula IIa:

13 mg (IVa) in 10 ml of 0.5M HCl are added to 7.5 microliter of thiophosgene and 1.3 ml CCl$_4$. The mixture is stirred for 1 hour at 20° C., the aqueous phase is washed 5 times with 5 ml of chloroform and the later eluting product is then cleaned by means of preparative HPLC. Complexing of (Va) with an equivalent Eu(III)chloride at pH 5–7 leads to a product, that after excitation at 370 nm shows the characteristic europium luminescence with sharp bands at 578, 594, 615, 653 and 693 nm.

EXAMPLE 10
Transformation of the isothiocyanate (Va) with the tripeptide triglycine:

0.1 mg isothiocyanate is transformed in water/acetonitrile 90/10 with 3 equivalents of triglycine for 16 hours at 20° C. The reaction solution is reprocessed by means of reversed phase HPLC and the product that elutes faster than the reagent is mixed at pH 5–7 with around 1 equivalent of an aqueous Eu (III)-chloride solution. The resulting complex shows after excitation at 370 nm the characteristic europium luminescence with sharp bands at 578, 594, 615, 653 and 693 nm.

EXAMPLE 11
Transformation of the amino compound (IVa) with fluorescein isothiocyanate into thiourea and production of a luminescent europium complex with additionally covalently bound fluorescein chromophore:

1 mg amino compound (IVa) is transformed in water/acetonitrile 90/10 with an equivalent fluorescein isothiocyanate for 16 hours at 20° C. The reaction solution is reprocessed by means of reversed phase HPLC and the product which elutes faster than the reagent is transformed with about one equivalent of an aqueous Eu(III)-chloride solution. The resulting complex, after excitation at 370 nm besides the inherent fluorescence of the fluorescein chromophore (maximum 516 nm), in an almost unchanged way shows the characteristic europium luminescence with sharp bands at 578, 594, 615, 653 and 693 nm, as it also is observed without fluorescein.

EXAMPLE 12
Dependence of the luminescence decay time of the acid (IIIb, Y=OH) complexed with europium$^{3+}$ from the pH in presence of the indicator dye bromothymol blue (BTB):

BTB is in the unprotonated state blue and in the protonated state yellow. Only the blue form leads to a reduction of the luminescence decay time of the europium complex of acid (IIIb, Y=OH) and the derivatives quoted in example 9 and 10 complexed with europium.

After production of a mixture of BTB with acid (IIIb, Y=OH) in water a significant reduction of the luminescence decay time between pH 3 and pH 7 is observed. By embedding the components in a sol-gel matrix or by immobilization and choice of a suitable dye absorbing between 570 and 710 nm, this pH range can be shifted into the application range if desired.

EXAMPLE 13
3-Amino-6,7-dimethoxy-1-methyl-4-trifluoromethyl-2-(1H)-quinolone and analogue N-functionalised derivatives of 6,7-dimethoxy-4-trifluoromethyl-2-(1H)-quinolone:

1 g 6,7-dimethoxy-3-nitro-4-trifluoromethyl-2-(1H)-quinolone is stirred in acetone with excess potassium carbonate and two equivalents of dimethylsulfate for 3 h at 20° C. The solution is filtered and evaporated and the product is cleaned by means of flash chromatography, melting point 254° C. The nitro compound is reduced in ethanol with 5% of platinum oxide and at 3 bar hydrogen pressure for the corresponding 3-amino compound. Yield 50% over both steps. Equally 1-phthalimidomethyl-6,7-dimethoxy-3-nitro-4-trifluoromethyl-2-(1H)-quinolone can be produced with bromomethyl phthalimide, and the 3-nitro-1-(4-nitrobenzyl)-6,7-dimethoxy-4-trifluoromethyl-2-(1H)-quinolone (melting point 184° C.) with 4-nitrobenzylbromide. The reduction of 3-nitro-1-(4-nitrobenzyl)-6,7-dimethoxy-4-trIfluoromethyl-2-(1H)-quinolone with platinum oxide in ethanol (2 bar hydrogen pressure for 5 h) gives the corresponding diamino compound.

EXAMPLE 14
1-(6,7-dimethoxy-4-trifluoromethyl-2-(1H)-quinolonyl) acetic acid:

1 g 6,7-dimethoxy-4-trifluoromethyl-2-(1H)-quinolone is heated in dioxan/water with excess potassium carbonate and two equivalents of bromoacetic acid for 3 h. The organic solvent is removed and the aqueous solution extracted with ethylacetate after acidification to pH 2.5. Flash chromatography dioxan/ethyl acetate/acetic acid on silica yields 50% 1-(6,7-dimethoxy-4-trifluoromethyl-2-(1H)-quinolonyl) acetic acid UV $\lambda$ max 366 nm (ethanol), emission max 430 nm (ethanol). Alternatively, the acid can be prepared using methyl chloroacetate and acetone/potassium carbonate and saponification of the corresponding substituted methyl acetate.

EXAMPLE 15
Optical sensor for carbon dioxide based on the europium3+ complex of IIIb.

The dye is dissolved in a suitable buffer solution (e.g. a bicarbonate buffer of pH 8.6). A small amount of the solution is encapsulated in a transparent container by means of a gas-permeable membrane (e.g. Teflon®) with the membrane facing the sample solution. The dye is excited at 350–400 nm, e.g. 370 nm and the luminescence intensity or decay time is measured at 615 nm. The decay time can e.g. be measured either directly (e.g. with a pulsed laser) or indirectly (e.g. via a phase measurement technique).

Flushing the sample solution with a gas containing carbon dioxide leads to diffusion of $CO_2$ into the buffer solution containing the europium complex. This causes a change in pH and, as a consequence, in luminescence. The change in luminescence intensity or decay time can be related to the $CO_2$ partial pressure or $CO_2$ concentration of the gas.

What is claimed is:

1.

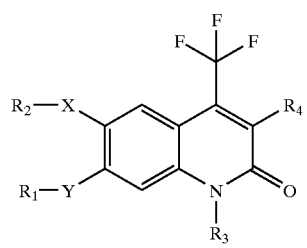

A substituted 4-triflouromethylcarbostyril compound according to formula 1 above, wherein the compound shows an absorption maximum between 350 and 420 nm and a luminescence maximum between 430 and 900 nm, the defined groups X and Y having the meaning NH, N-alkyl and oxygen in any combination, $R_1$ and $R_2$ either means a methylene bound over X and Y together, 1,2-ethylene, 1,3-propylene or in any combination hydrogen, alkyl from $C_1$ to $C_{11}$ and if necessary alkyl substituted with functionalised groups, which alkyl is suitable for complexing metal ions or serves for binding the molecule to suitable groups of a target molecule or solid carrier material, and the residues $R_3$ and $R_4$ means hydrogen or that either one of them is hydrogen and the other residue is suitable for complexing metal ions or is suitable for binding the molecule to suitable groups of a target molecule or solid carrier material, or that this other residue if necessary carries a functionalised side chain that at the same time is suitable for binding the molecule to functional groups of a target molecule or solid carrier material and for complexing trivalent metal ions of the group of the lanthanides, or that both residues $R_3$ and $R_4$ each mean a functionalised side chain, one for binding the molecule to suitable groups of a target molecule or solid carrier material and a side chain for complexing of trivalent metal ions from the group of the lanthanides.

2. The substituted trifluoromethylcarbostyril compound according to claim 1, wherein X and Y means oxygen or NH or N-alkyl and that the residues $R_1$ and $R_2$ mean hydrogen or common methylene or alkyl from $C_1$ to $C_{11}$, $R_3$ hydrogen and $R_4$ an oxygen, carbon or nitrogen substituent.

3.

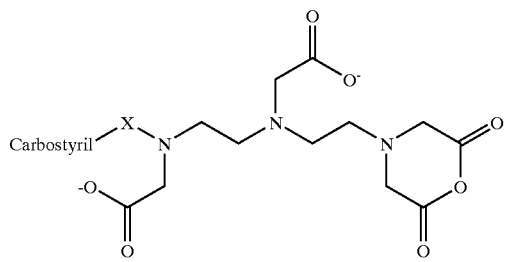

II

The substituted trifluoromethylcarbostyril compound according to claim 1, wherein the compound comprises a side chain having the structural formula II, wherein X is $CH_2$—, $CH_2$—$CH_2$—, O—$CH_2$—$CH_2$, or NH—CO—$CH_2$— with any appertaining cations.

4.

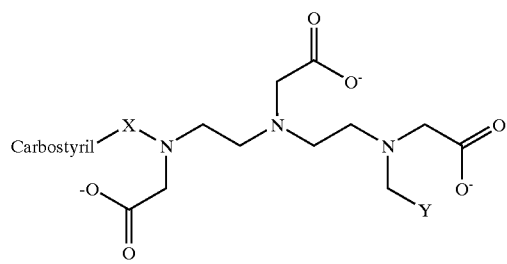

III

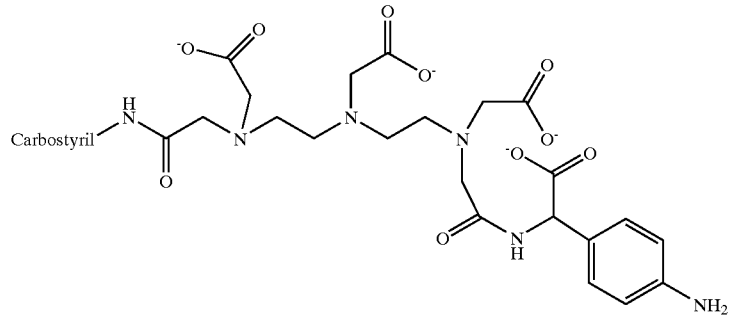

IV

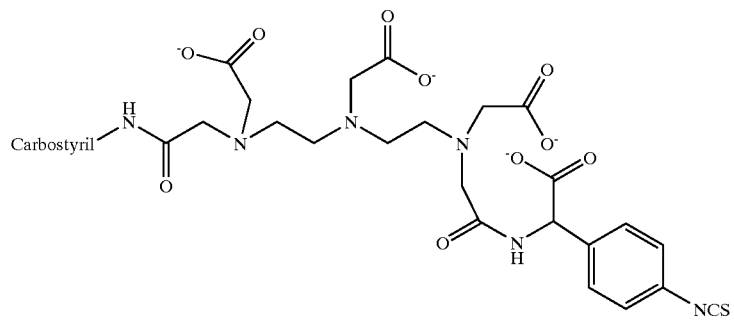

V

The substituted trifluoromethylcarbostyril compound according to claim 1, wherein the compound carries a side chain having the structural formula III, IV or V, in which X in structural formula III has the same meaning as in structural formula II and Y can be a substituent with an additional carboxylate group and any appertaining cations.

5. The substituted trifluoromethylcarbostyril compound according to claim 1, wherein the side chain is complexed with a trivalent europium or terbium ion.

6. The substituted trifluoromethylcarbostyril compound according to claim 1, wherein the compound shows at an absorption maximum of 350–440 nm and an emission maximum in the range of 400–570 nm, and, if the compound is complexed with Eu3+ or Tb3+, a typical emission spectrum of activated europium or terbium complexes between 500 and 900 nm.

7. A method of using the substituted trifluoromethylcarbostyril compound according to claim 1, to excite a dyestuff absorbing at the emission wavelength in a sol gel matrix or after an eventual covalent immobilization in a hydrogel which comprises contacting the dyestuff with the compound.

8. A method of using the substituted trifluoromethylcarbostyril compound according to claim 1, which comprises measuring the luminescence spectra after a delay time of 0.1 to 3000 microseconds.

9. A method of using the substituted trifluoromethylcarbostyril compound according to claim 1, which comprises measuring the luminescence decay times in the range of 10–3000 microseconds.

10. A method of using the substituted trifluoromethylcarbostyril compound according to claim 1, which comprises measuring luminescence spectra or decay times after immobilization of the compound on a target molecule or on a solid carrier matrix.

11. A method for measuring luminescence effects which comprises complexing the substituted trifluoromethylcarbostyril compound of claim 1 with europium before or after an eventual immobilization and measuring the luminescence effects and decay times after contacting with a suitable analyte.

12. A method for measuring luminescence effects which comprises complexing Europium3+ with the substituted trifluoromethylcarbostyril compound according to claim 1 and contacting the complex with a directly bound or free dye molecule absorbing in the range of 580–710 nm and then measuring the luminescence effects and decay times.

13. The substituted trifluoromethylcarbostyril compound according to claim 1, wherein the compound carries a $(CH_2)_n$ X substituent on nitrogen 1, where n means 1–8 and X means substituted phenyl, carboxylic acid or a reactive derivative of a carboxylic acid, amino, isocyanate or isothiocyanate.

14. A method of using the substituted trifluoromethylcarbostyril compound according to claim 13 as a luminescent marker for a peptide, protein, RNA or DNA, which comprises binding the compound covalently to the peptide, protein, RNA or DNA.

15.

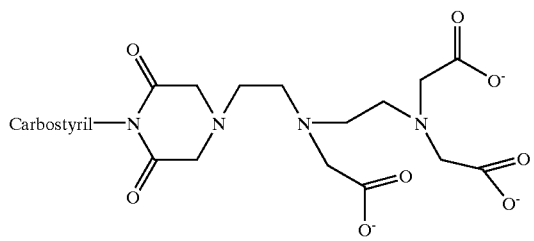

IId

The substituted trifluoromethylcarbostyril compound according to claim 1, wherein the compound has the general structural formula IId.

16.

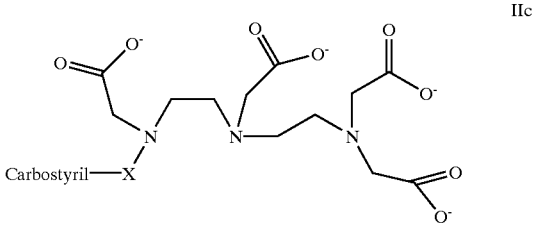

IIc

The substituted trifluoromethylcarbostyril compound according to claim 1, wherein the compound has the general structural formula IIc and X is $CH_2$—, $CH_2$—$CH_2$, O—$CH_2$—$CH_2$, or NH—CO—$CH_2$, or $NCH_3$—CO—$CH_2$ with any appertaining cations.

17.

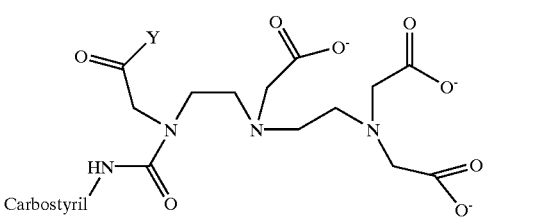

IIIa

The substituted trifluoromethylcarbostyril compound according to claim 1, wherein the compound has the general structural formula IIIa carrying a side chain Y with the meaning NH—R or NH—NH—CO—R and R has the meaning of any suitable linker group.

18. A method of using the substituted trifluoromethylcarbostyril compound according to claim 1, to determine in the sensitive pH-range any change caused, directly or indirectly by suitable analytes which comprises measuring a change in the luminescence intensity, or in the luminescence decay time, or measuring a change in both parameters.

19. A method for measuring pH which comprising dissolving the substituted trifluoromethylcarbostyril compound of claim 1 in a buffer solution and using a membrane to mediate the selective transport of carbon dioxide gas into the buffer solution.

20.

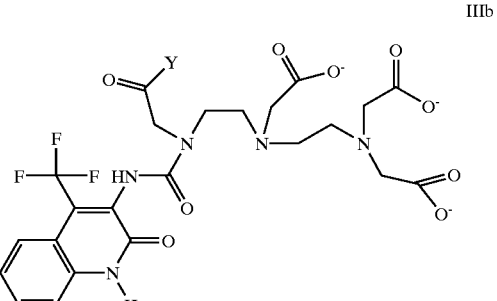

IIIb

The substituted trifluoromethylcarbostyril compound according to claim 1, wherein the compound comprises the structural formula IIIb and Y has the meaning OH, NH—R or NH—NH—CO—R, and R has the meaning of any linker or additional complexing group.

21. The Eu(III)-complex of the trifluoromethylcarbostyril compound according to claim 20, wherein the complex comprises a broad excitation maximum of about 370 nm, and a main antenna fluorescence emission maximum of about 450 nm and a strongest europium emission maximum at about 615 nm as shown in FIG. 1.

22. A method of using the substituted trifluoromethylcarbostyril compound according to claim 21 as a luminescent source, which comprises exciting the compound with a light source.

23. The method of claim 22, wherein the light source is a LED.

24. The method according to claim 22, wherein the light source is a laser.

* * * * *